June 20, 1961 H. C. SMITH, JR 2,989,255
FISHING ROD WRAPPING DEVICE
Filed Oct. 14, 1959 2 Sheets-Sheet 1
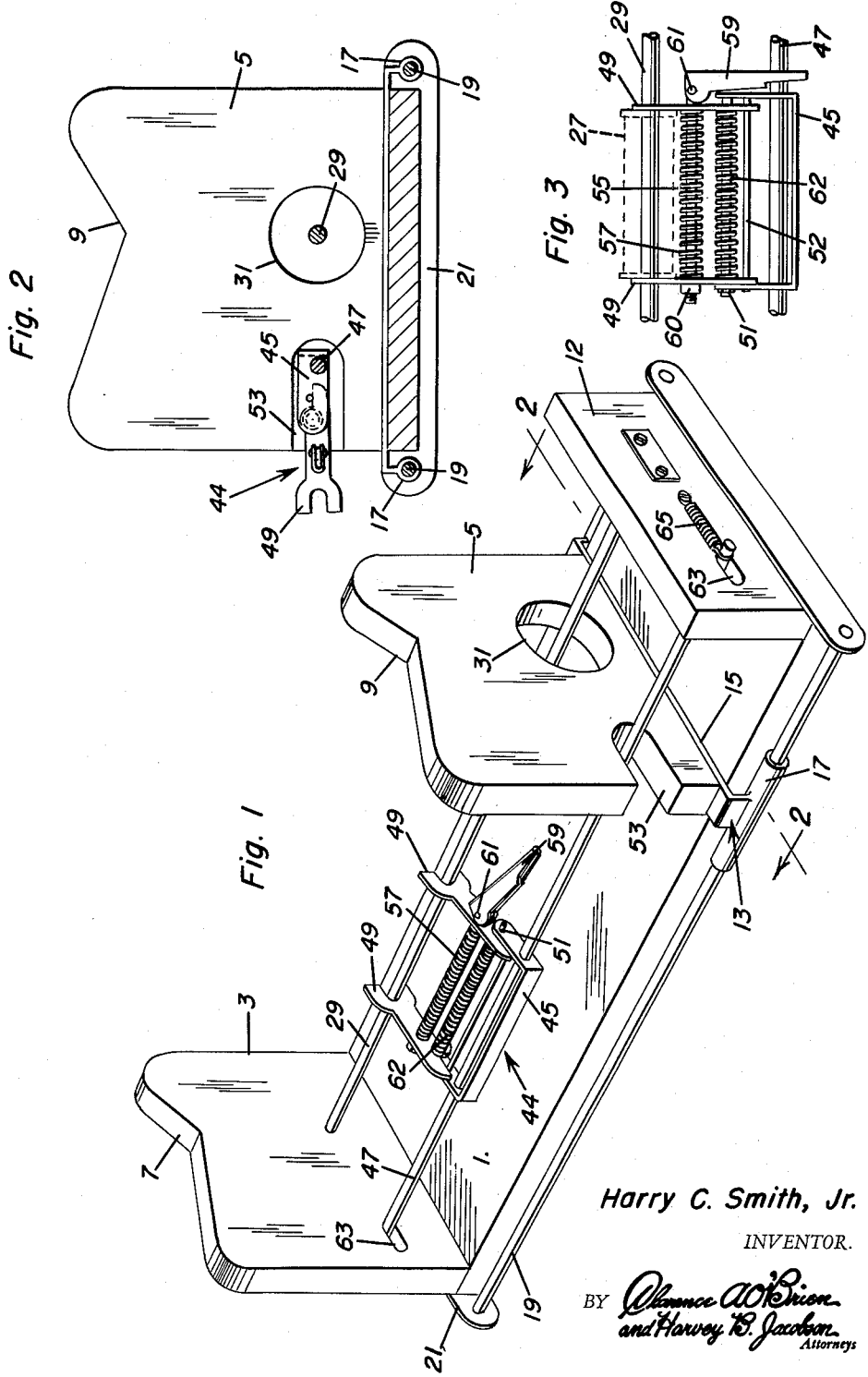
Harry C. Smith, Jr.
INVENTOR.
BY Clarence A. O'Brien
and Harvey B. Jacobson
Attorneys June 20, 1961     H. C. SMITH, JR     2,989,255
FISHING ROD WRAPPING DEVICE
Filed Oct. 14, 1959     2 Sheets-Sheet 2
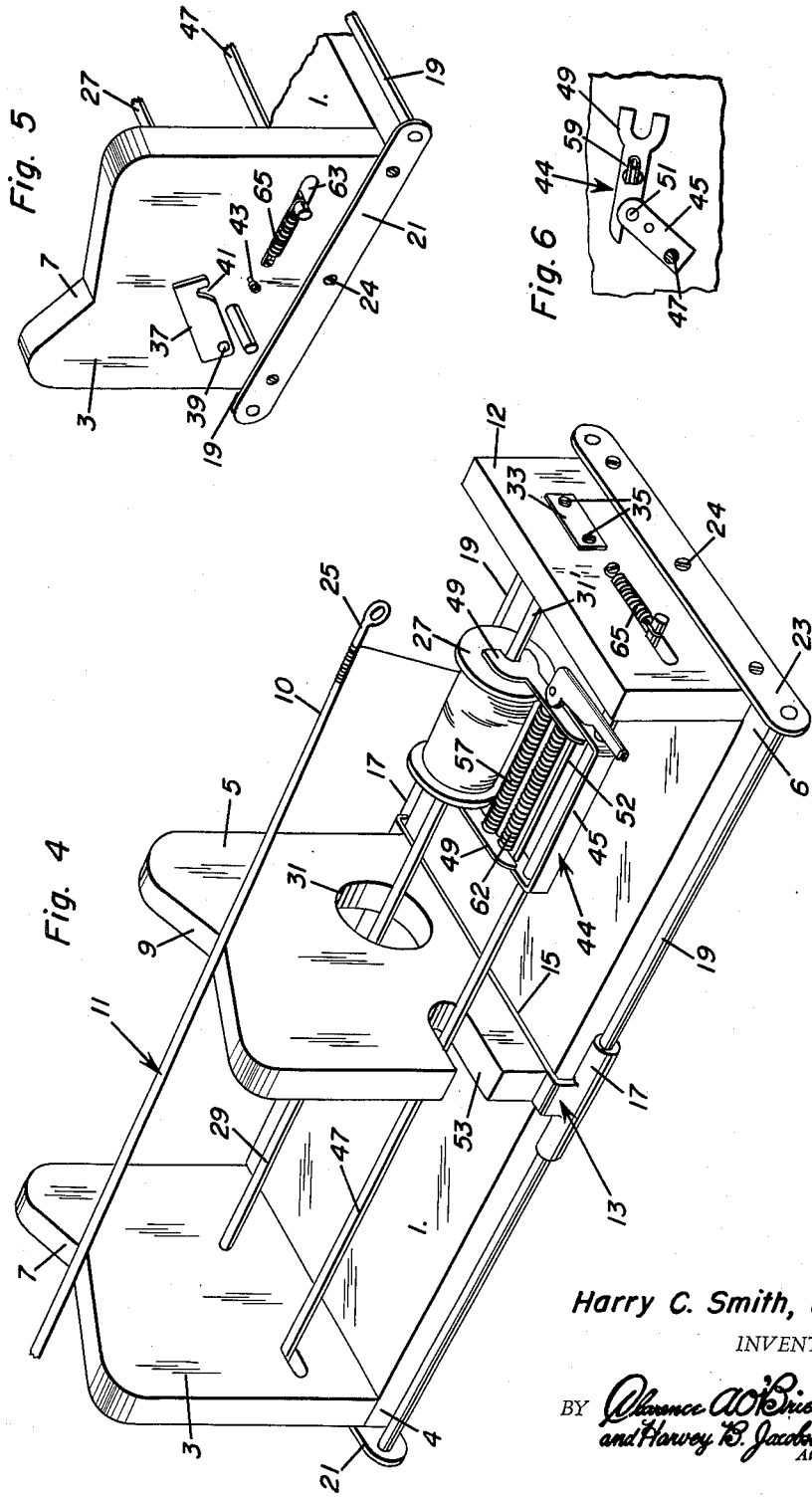
Harry C. Smith, Jr.
INVENTOR.

United States Patent Office 2,989,255
Patented June 20, 1961

2,989,255
FISHING ROD WRAPPING DEVICE
Harry C. Smith, Jr., Rte. 1, Box 115, Seaside, Oreg.
Filed Oct. 14, 1959, Ser. No. 846,403
9 Claims. (Cl. 242—7)

This invention relates to improvements and devices for wrapping fishing rods with thread, cord, or the like, to secure ferrules and guides on such rods, or for decorative wrapping thereof.

The primary object of the invention is to provide a practical device for holding a fishing rod horizontally for rotation to wrap thereon thread, or cord, supplied by a rotatably mounted spool, together with brake means for variably, frictionally engaging opposite ends of the spool to variably tension thread or cord, during the wrapping operation according to requirements when the rod is being wrapped with threads, or cords, of different types and gauges.

Another object is to provide a device according to the foregoing adapted for holding a fishing rod with its tip portion completely free from engagement with a support and located over a spool of thread, or cord, to facilitate securing a tip ferrule on the tip portion by wrapping with the thread or cord.

Still another object is to provide a time and labor saving device for use in wrapping fishing rods, according to the foregoing, and which is of very simple, inexpensive construction, durable and readily portable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the device in a preferred embodiment thereof;

FIGURE 2 is a view in vertical cross-section taken on the line 2—2 of FIGURE 1 with the brake means inverted;

FIGURE 3 is a fragmentary view in plan, partly in broken lines, of the brake means and parts associated therewith;

FIGURE 4 is a perspective view of the device illustrating its use in wrapping a tip ferrule on the tip portion of a fishing rod;

FIGURE 5 is a fragmentary perspective view of one end of the device, and

FIGURE 6 is a fragmentary view in side elevation, partly in section, of the brake means.

Referring to the drawings by numerals, the device of this invention comprises an oblong, preferably rectangular, base panel 1 for resting on a table, bench, or the like, not shown.

A pair of substantially rectangular, upright fixed and movable fishing rod supports 3, 5 respectively, are provided on the panel 1 and which extend transversely thereof in spaced relation and are spaced apart longitudinally of the panel 1. The supports 3, 5 are provided with like, top notches 7, 9, respectively, therein for seating a fishing rod 11 therein horizontally parallel with said panel 1.

The fixed support 3 is suitably secured on one end 4 of the panel 1. The movable support 5 is movably mounted, by means presently described, for adjustment toward and from the fixed support 3 over the panel 1 and intermediate said support 3 and a fixed transverse support member 12 rising from the other end 6 of the panel 1 and serving a purpose presently clear.

The movable support 5 is adjustably mounted by means of a carriage 13 comprising a bar 15 on which said support 5 is suitably fixed and which extends transversely over the panel 1 and terminates in a pair of downwardly offset, tubular guide sleeves 17 slidable along a pair of track rods 19 extending along opposite side edges of the panel 1 and terminally fixed in a pair of transverse bars 21, 23 respectively secured, as at 24, on the opposite ends 4, 6 respectively, of the panel 1.

As will now be seen, the movable support 5 is adjustable toward or from the fixed support 3 to seat a fishing rod 11 at selected longitudinal points on said rod for wrapping a selected intermediate portion of the rod by rotation of the rod 11 in the notches, 7, 9, for instance manually, and with the tip end portion 10 of the rod 11 projecting free between the movable support 5 and the support member 12 for wrapping a tip ferrule 25, such as a line guide on said rod 11 with the ferrule 25 and the tip portion 10 free of support so that said tip portion 10 and ferrule 25 are in a completely accessible position for wrapping.

Means for mounting a spool 27 of thread or cord, in the device for wrapping on the rod 11 comprises a spool supporting rod 29 extending longitudinally over the panel 1 in spaced relation thereto and below the notches 7, 9 in a common plane with said notches for rotatably supporting a spool loaded therein and on which the spool 27 is longitudinally slidable through an opening 31 in the movable support 5 into positions at opposite sides of the support 5 for wrapping an intermedite portion of the rod 11 or for wrapping the tip portion 10 and/or ferrule 25.

The spool supporting rod 29 is suitably movably supported at a front end 31' thereof in an opening, not shown, in the fixed support member 12 behind a cover plate 33 secured by screws 35 to said member 12, and said rod 29 extends centrally through the opening 31 and is slidably extended through the fixed support 3. By this means, the rod 29 is slidable to withdraw its front end 31' out of the fixed support member 12 sufficiently for loading of a spool, or spools, onto said road 29 between the movable support and the fixed support member 12, after which the rod 29 may be advanced to replace its front end 31' so that said rod 29 when loaded will be properly supported.

Lock means is provided for preventing casual retraction of the spool supporting rod 29 by holding it in its advanced position. This means comprises a stop bar 37 pivoted, as at 39 on the outer face of the fixed support 3 for swinging downwardly crosswise of said rod 29 to block retraction of said rod 29. A hook end 41 on the stop bar 39 engages a screw 43 on said support 3 and limits downward swinging of said stop bar 37.

Brake means 44 is provided for frictionally engaging a spool 27 on the spool supporting rod 29 to variably tension the thread, or cord, being wound on the fishing rod 11 from said spool.

The brake means 44 comprises a U-shaped carriage 45 slidable on a guide rod 47 parallel with and horizontally opposite the spool supporting rod 29 and on which the carriage 45 is also rotatable all for a purpose presently seen. A pair of forked grip bars 49 are pivoted on a pivot rod 51 on said carriage 45 for straddling engagement with the spool supporting rod 29 at opposite ends of the spool 27 by rotation of said carriage 45 clockwise, as viewed in the drawings to position the pivot rod 51 of said bars 49 in past dead center relation to the rods 29 and 47. A stop rod 52 on the carriage 45 is engaged by said bars 49 to establish the past dead center position of said rod 51. By swinging the carriage 45 counter-clockwise, as viewed in the drawings the bars 49 may be withdrawn from straddling relation to the spool supporting rod 29 to permit positioning of a spool 27 between said bars 49. Also, by swinging of the carriage 45 in a counter-clockwise direction, as viewed in the drawings, the carriage 45 and including the bars 49 may be inverted for sliding of the brake means 44 past the movable support 5 through a recess 53 in one side edge of the support 3. Thus, as will be seen, the brake means 44 can be shifted for operation on a spool 27 positioned either between the supports 3, 5, or, between the supports 5 and the support member 12, that is to say when the spool 27 is positioned for wrapping an intermediate portion or the tip portion 10 of the rod 11 positioned in the notches 7, 9.

The brake means includes devices for frictionally clamping the grip bars 49 against opposite ends of the spool 27 to frictionally and variably grip the spool 27 therebetween. This means comprises a nut equipped bolt 55 extended through the bars 49 and on which said bars 49 are slidable, one toward the other in opposition to a coil spring 57 on said bolt 55 interposed between the bars 49. A cam lever 59 pivoted, as at 61, on said bolt and engaging one of the bars 49 is operative from a release position shown in FIGURE 1 into an effective position shown in FIGURE 4 to urge one bar 49 toward the other so that said bars 49 frictionally grip opposite ends of the spool 27 when the latter is interposed between said bars. A coil spring 61 on the pivot rod 51 between said bars 49 also opposes movement of either bar 49 toward the other to augment the spring 57. The lever 59, and a nut 60 on the bolt 55 confine the bars 49 therebetween so that by adjusting the nut 60, the friction gripping action of said bars 49 in response to camming action of the lever 59 may be varied in accordance with the tension requirements in wrapping with thread or cord of different types or gauges.

The guide rod 47 is extended through the recess 53 in the movable support 5 to guide the brake means 44 through said recess and is slidably mounted at its ends in horizontal slots 63 in the fixed support 3 and the support member 12. Thus said guide rod 47 is movable toward the spool supporting rod 29 to maintain the grip bars 49 in straddling relation to the spool supporting rod 29 and in frictional engagement with said rod to retain the brake means 44 against casual sliding movement on the guide rods 47. Coil springs 65 suitably connected to the guide rod 47 and to the fixed support 3 and the support member 12 urge the guide rod 47 toward the spool supporting rod 49.

The use and operation of the device will be readily understood. A fishing rod 11 is placed in the notches 7, 9 with the tip portion 10 projecting in overhanging position from the movable support 5 between the latter and the support member 12 and with the movable support 5 adjusted to space the same from the fixed support 3 to support the rod 11 at longitudinally spaced points thereon, as desired, for wrapping of the rod at a desired intermediate portion thereof between said supports 3, 5.

The carriage 45 of the brake means 44 is swung upwardly on the guide rod 47 with the cam lever 59 in released position and this operates the carriage 45 and grip bars 49 into break joint relation, as shown in FIGURE 4, to withdraw the grip bars 49 from straddling relation to the spool supporting rod 29. The spool 27 is then loaded onto the spool supporting rod 29, in the manner already described, and slid into the desired position at one or the other side of the movable support 5 for wrapping the desired intermediate portion of the rod 11 or the tip portion 10 thereof by revolving the rod 11 by hand to wind thread or cord thereon from the spool 27.

The brake means 44 is then slid in inverted position, shown in FIGURE 2, on the guide rod 47 to position it at the same side of the movable support 5 as the spool 27. Then, with the carriage 45 and the grip bars 49 in break joint relation, the carriage 45 is swung clockwise to position the grip bars at opposite ends of the spool 27 with said bars straddling the spool supporting rod 29 and said spool. The carriage is then swung downwardly further and counter-clockwise to position the rod 51 in past dead center relation to the spool supporting rod 29 and to the guide rod 47. In this operation, the guide rod 47 moves away from the rod 29 in opposition to the coil springs 65. Now, the cam lever 59 is swung from idle position shown in FIGURE 1 to cause the grip bars 49 to grip opposite ends of the spool 27 in a manner which it is believed will now be clear. The grip bars 49 are thrust against the spool supporting rod 29 by the action of the springs 65 on the guide rod 47 whereby to frictionally lock the grip bars 49 in frictional engagement with the spool supporting rod 29, whereby to hold the brake means 44 and the spool 27 against casual sliding out of place. The device is now ready for use in a desired wrapping operation on the fishing rod 11.

Of course, a plurality of spools of different threads may be loaded onto the spool supporting rod 29 and selectively positioned for use, as described with reference to the spool 27, and the brake means 44 may be used, in the manner already described, with any one of the selected spools.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for wrapping a fishing rod comprising a base, a pair of upright supports rising from said base in spaced relation for supporting a fishing rod thereon in horizontal position for rotation to wrap thread around the fishing rod, a member fixed on said base in spaced relation to said supports, a horizontal spool supporting rod extended through both supports with one end extended into said member and being slidably mounted through one of the supports for retraction to space said end from said member for loading of a spool of thread onto said rod for rotation thereon to supply thread for wrapping on a fishing rod and sliding of said spool along said supporting rod into different positions for wrapping different portions of a fishing rod rotated on said supports, brake means for retarding rotation of a spool loaded on said supporting rod, and means mounting said brake means for sliding movement into braking relation to a spool slid on said supporting rod into different positions.

2. The combination of claim 1, and releasable stop means on said one support for blocking retraction of said supporting rod when said supporting rod is loaded with a spool.

3. The combination of claim 1, said means mounting said brake means comprising a guide rod mounted on said base, said brake means including a carriage slidable on said guide rod.

4. The combination of claim 1, said brake means comprising a pair of grip bars operative for gripping a spool therebetween, and a cam lever operatively connected to said grip bars.

5. A device for wrapping a fishing rod comprising a base, a pair of upright supports rising from said base in spaced relation for supporting a fishing rod thereon in horizontal position for rotation to wrap thread around the fishing rod, a member fixed on said base in spaced relation to said supports, a horizontal spool supporting rod extended through both supports with one end extended into said member and being slidably mounted through one of the supports for retraction to space said end from said member for loading of a spool of thread onto said rod for rotation thereon to supply thread for wrapping on a fishing rod and sliding of said spool along said supporting rod into different positions for wrapping different portions of a fishing rod rotated on said supports, and brake means for retarding rotation of a spool loaded on said supporting rod.

6. In a device for wrapping a fishing rod with thread, means for supporting a fishing rod for rotation to wrap thread thereon, means for supporting a thread supplying spool for rotation and sliding movement longitudinally along a fishing rod supported by said first named means, brake means for opposing rotation of a spool supported by the second named means, and means mounting said brake means for sliding movement in correspondence with sliding movement of a spool supported by said second named means, said second named means including a guide rod, said means mounting said brake means including a second guide rod, said brake means including a carriage slidable on said second guide rod, and a pair of bars on said carriage operative to grip opposite ends of a spool.

7. The combination of claim 6, and cam means on said carriage for operating said bars.

8. The combination of claim 6, said bars being terminally forked to straddle said first named rod, said carriage being rotatable on said second guide rod and said bars being pivoted on said carriage for movement of said bars into and from straddling relation to said first named guide rod in response to rotation of said carriage.

9. The combination of claim 8, the pivot of said bars on said carriage assuming past dead center locking relation to said rods to retain said bars in straddling relation.

References Cited in the file of this patent

UNITED STATES PATENTS

| | | |
|---|---|---|
| 2,556,827 | Striano | June 27, 1951 |
| 2,609,155 | Fosnaugh | Sept. 2, 1952 |